United States Patent [19]

Chen et al.

[11] Patent Number: 4,504,402

[45] Date of Patent: Mar. 12, 1985

[54] ENCAPSULATED PHASE CHANGE THERMAL ENERGY STORAGE MATERIALS

[75] Inventors: Johnson C. H. Chen; John L. Eichelberger, both of King of Prussia, Pa.

[73] Assignee: Pennwalt Corporation, Philadelphia, Pa.

[21] Appl. No.: 609,665

[22] Filed: May 14, 1984

Related U.S. Application Data

[60] Division of Ser. No. 504,029, Jun. 13, 1983, , which is a continuation-in-part of Ser. No. 466,802, Feb. 16, 1983, abandoned, which is a continuation-in-part of Ser. No. 145,228, Apr. 30, 1980, abandoned.

[51] Int. Cl.$^3$ .................................................. C09K 3/18
[52] U.S. Cl. ...................................... 252/70; 428/403; 428/407; 428/402.24
[58] Field of Search ...................... 252/70; 427/3, 213, 427/214, 221; 428/403, 407, 304.4, 221, 402.24; 523/200, 207, 211, 210; 264/7; 165/53, 104.17

[56] References Cited

U.S. PATENT DOCUMENTS 4,256,785  3/1981  Dannelly ........................ 427/316 X
4,268,558  5/1981  Boardman ..................... 428/403 X
4,418,163  11/1983  Murakami et al. ................. 523/205

OTHER PUBLICATIONS

*Encapsulation of Phase Change Materials in Concrete Masonry Construction,* Progress Report No. 1, Aug. 1977–Feb. 1978.
*Encapsulation of Phase Change Materials in Concrete Masonry Construction,* Progress Report No. 2, Mar. 1978–May 1978.

*Primary Examiner*—Michael R. Lusignan

[57] ABSTRACT

A thermal energy storage composite pellet-shaped product of about ⅛ inch to 1 inch in size, formed of an outer seamless shell member which defines a cavity that permanently encases a phase-change composition, the composition being present in a quantity such that the total volume of the composition, whether in its solid form, liquid form, or both forms as in its transition state, never exceeds the volume of the cavity; and a process for making the product which includes using the phase-change composition in a compacted powder form as cast about which the shell member is formed by roll-coating steps.

12 Claims, 2 Drawing Figures

ENCAPSULATED PHASE CHANGE THERMAL ENERGY STORAGE MATERIALS

CROSS REFERENCE TO RELATED APPLICATIONS

This application is a division of application Ser. No. 504,029, filed June 13, 1983, which is a continuation-in-part application of copending application Ser. No. 466,802, filed Feb. 16, 1983, now abandoned, which was a continuation-in-part of Ser. No. 145,228, filed Apr. 30, 1980, now abandoned.

BACKGROUND OF THE INVENTION

Thermal energy storage technology is important because it saves energy, provides economic benefits, and permits the convenient use of periodic energy sources, such as solar energy. Certain thermal energy storage systems using the specific heat of water, rocks, and ceramics are already commercially available. Systems that contain phase change materials are being developed because a high energy storage density is associated with the change of phase. Long term thermal energy storage can be achieved by means of heats of solution, hydration, and reaction of certain chemicals. All of these thermal energy storage materials have one or more of the following technical difficulties that must be overcome: agglomeration, component separation, supercooling, large volume in comparison with thermal capacity, low thermal conductivity, expensive heat exchanger requirements, corrosion of container walls, incompatibility with system components, and limited surface area.

One attempted method to circumvent these problems was to form construction composites of the thermal energy storage materials with concrete or plastic, but new problems of seepage, component incompatibility, and reduced thermal conductivity occurred. Brookhaven National Laboratory reports BNL 50827 (August 1977–February 1978) and BNL 50896 (March 1978–May 1978), for example, discuss the problems with, and failures experienced in, attempting to incorporate phase change materials, both the inorganic salt hydrate (e.g., $CaCl_2.6H_2O$, $Na_2SO_4.10H_2O$) and organic (e.g., fatty acids, polyethylene glycol) types, into ordinary concrete, polymer-impregnated concrete and polymer concrete. The project met with limited success in its attempts to introduce phase change materials into concrete, and that little success was primarily achieved using foamed glass beads impregnated with $CaCl_2.6H_2O$. The incorporation of thermal energy storage materials into plastics is disclosed in U.S. Pat. No. 4,003,426. The thermal energy storage material is dispersed into an uncured polymeric resinous matrix which is then cross-linked. As stated in the patent, this method is useful only with thermal energy storage materials which will form stable dispersions in the uncured polymer and requires the envelopment of the cured structure in a gas or vapor barrier material for best results.

Another attempted method for overcoming the problems was macro-encapsulation. In this case, thermal energy storage materials about 1 inch diameter or larger are jacketed with multilayer flexible plastic/metal film composites, steel cans, or polyolefin bottles. This approach may be useful for certain applications but commercialization has been hampered by poor thermal conductivity, deformation of the packages, and degradation of the encapsulating materials by chemical attack and mechanical stresses.

Still another approach is microencapsulation. Research on thermal energy storage systems containing microencapsulated wax demonstrated the need for encapsulated thermal energy storage materials and the technical feasibility of their use. The results proved that microencapsulated thermal energy storage material can be packed into a bed through which heat exchange fluid passes. In this manner the heat exchange fluid directly contacts the heat storing material. The results also included improved thermal conductivity, reduced complexity in the heat exchanger, reduced thermal energy storage material separation problems, and reduced equipment costs. However, overall system costs were found to be too high with first generation microencapsulated thermal energy storage material due to the high processing costs of the encapsulating procedure. This work is described in report NSF/RANN/SE/AER 74-09186, dated November 1975. Subsequent work has not significantly altered these conclusions.

One the principal goals of microencapsulation was to reduce thermal conductivity path lengths in heat transfer systems by reducing the size of the discrete thermal energy storage material particles employed. Capsules were made by coating paraffin particles in the 8–2000 micron (0.0003"–0.08") range with wall-forming materials, such as gelatin (which was generally unsatisfactory), modified nylon and urea-formaldehyde resin. It was observed that the 50 micron nylon-coated particles exhibited no leakage after 300 thermal cycles, while the 1000–2000 micron samples exhibited some leakage after 150 cycles. These results notwithstanding, the optimum cost that could be achieved using the microencapsulation techniques of the prior art was three to four times the maximum break-even figure for commercial application. Consequently, this approach was dropped until such a time that a less costly encapsulating procedure, particularly for particles in the 8–2000 micron range, was devised or until a method was discovered to provide encapsulation of water-soluble salts.

Phase change materials (PCMs) for thermal energy storage applications offer advantages over materials such as water or rocks, whose thermal storage capacity is based exclusively on sensible heat. These advantages include higher energy density, less temperature variation, and, as a consequence, higher heat collection efficiency. Nevertheless, the PCMs have their drawbacks. Compared with water or rocks they are generally higher in cost, lower in heat transfer rates, and more corrosive. In addition, many PCMs can undergo phase separation. Widespread application of PCMs in heat storage systems will depend on cost effective packaging materials and configurations for the PCMs, and appropriate heat exchange systems.

Although each of the earlier-discussed approaches to energy storage offers a partial answer to heat storage problems, a versatile solution that combines flexibility in material selection, full utilization of latent heat, high production efficiency, and long term reliability of the heat storage system remained to be invented. The product of this invention and the process for preparing the product provided such a solution.

Another serious problem must be overcome when phase-change materials are placed within rigid materials of construction, such as concrete, is the problem of expansion of the PCMs upon phase-changes, resulting in fractures and serious damage to the construction material. The product and process of this invention overcomes this otherwise serious problem.

This invention provides a process for solid state encapsulation of both water soluble and insoluble PCMs employing common, commercially available raw materials and well-known equipment. One aspect of the process involves pressing PCMs into aspirin-size tablets which are then coated with organic resin formulations. The size of the resulting capsules lies between that of plastic spheres and microcapsules. The capsules are small enough to provide efficient heat transfer and to prevent possible phase separation, yet are large enough for low-cost mass production. Because the capsules are designed to be used in large quantity for long term thermal cycling applications, the durability, flexibility, and cost of the capsule wall materials are important parameters.

SUMMARY OF THE INVENTION

The product of this invention is described as a thermal energy storage composite product, capable of incorporation within rigid building construction components without causing fracture or damage to the components or product after the product undergoes repeated thermal change cycles, said product comprising:

(a) an outer shell member having a longest dimension of from about ⅛ inch to about 1 inch and having interior surfaces defining an internal cavity that is adapted to permanently encase a thermal energy storage phase-change composition, said shell being comprised of at least one seamless layer of a wall-forming material that is substantially impermeable to and non-reactive with said phase-change composition or water, the total volume of the wall-forming material being from about 5% to 30% of the volume of said cavity; and (b) a thermal energy storage phase-change composition permanently disposed within the cavity of the shell, said phase-change composition being capable of existing in solid form, a melted liquid form, or a transition state that includes both the liquid and the solid forms, the composition being present in a quantity such that the total volume of composition whether in the solid form, the liquid form, or the transition state does not exceed the volume of the cavity.

It is preferred that the outer shell member of (a) have convex shaped outer surfaces with rounded edges; that the outer shell member of (a) be comprised of multiple seamless coatings of the wall-forming material; that the interior surfaces of shell member (a) be coated with a primer substance that is water-resistant and non-reactive with both the phase-change composition and the wall-forming material, such as asphalt or an acrylic polymer, and that the primer substance volume be less than about 5% of the volume of the cavity.

Preferred wall-forming materials are selected from the groups consisting of copolymer latex of butadiene-acrylonitrile, copolymer of vinylidene chloride-acrylic, resinous latexes, rubber latexes, epoxy polymers, polyurethane polymers, acrylic polymers, cellulose acetate and polyamides.

Preferred phase-change compositions are a glauber salt eutectic mixture, sodium hydroxide, polyethylene, sodium sulfate decahydrate, sodium thiosulfate pentahydrate, calcium chloride hexahydrate, magnesium nitrate hexahydrate, the eutectic of magnesium nitrate hexahydrate and ammonium nitrate, potassium fluoride tetrahydrate, sodium acetate trihydrate, stearic acid, the eutectic of naphthalene and benzoic acid and paraffinic hydrocarbons.

It is preferred that the liquid density of the phase-change composition is at least 85% but less than 100% of its solid density when formed as a compacted powder.

The product can be incorporated within and be dispersed throughout rigid construction bulding components such as various concretes (conventional concretes, polymer, epoxy, or polyester) of gypsum, preferably in an amount that is less than about 75% of the total weight of the final components, preferably 20% to 50% by weight. Such components can be all or a part of a building's walls, floors or ceilings.

It is essential that the volume of the phase-change composition within the cavity not exceed the volume of the cavity at any time, regardless of whether the state of the composition is liquid, solid or includes both liquid and solid as in a transition state. If the cavity volume is exceeded, the product might be damaged upon thermal cycling, but the most serious problem is that if such a product is incorporated within rigid construction components, such as conventional concretes, the construction component will fracture or suffer other damage after undergoing thermal cycles due to the product expansion.

The preferred process of this invention for making the above product, is defined as a process for manufacturing a thermal energy storage phase-change composite product, comprising:

(a) selecting a thermal energy storage phase-change composition having a phase-change transition temperature within the temperature range of the contemplated environment in which the product is to be used, and maintaining the temperature of the composition below the melting point of the composition, after the composition has been first melted, to provide a solidified thermal energy phase-change composition;

(b) converting the solidified thermal energy storage phase-change composition of (a) to a flowable powder to provide a flowable powder composition while maintaining the composition at a temperature below its melting point;

(c) compacting and pelletizing the flowable powder composition of (b) to form discrete pellet-shaped compacted powder structures having a longest dimension of from about ⅛ inch to about 1 inch and a shortest dimension of at least about ⅛ inch while maintaining a temperature below the melting point of the composition, the degree of compacting being controlled to provide compacted powder structures of sufficient integrity to withstand coating with a wall-forming material as well as an apparent solid density that is less than or equal to the liquid density of the phase-change composition;

(d) coating each of the compacted powder compositions with a curable liquid wall-forming material comprising from about 5% to 30% by weight of the product based upon the final cured weight of the wall-forming material, while maintaining a temperature below the melting point of the composition, said wall-forming material when in a cured state being nonreactive with and substantially impermeable to both the phase-change composition and water; and then (e) curing the liquid wall-forming material on each of the compacted powder compositions to form a permanent seamless shell, that is substantially impermeable to and non-reactive with both the phase-change composition and water, which encapsulates each of the compacted powder compositions to provide the product;

said product being capable of dispersion throughout rigid building construction components without causing fracture or damage to the components or product upon repeated thermal change cycles of the encapsulated thermal phase-change storage composition.

In step (c) it is essential that the apparent solid density of the compacted powder structures not exceed the liquid density of the phase-change composition. The apparent solid density of the structure is the weight of the structure divided by the volume of the structure—measured as if the outer surfaces of the structure were completely impermeable and sealed. In practical effect, the compacted powder structure provides a casting mold about which the shell member of the product is cast. The structure, therefore, defines the cavity within the shell member of the product. Thus, upon melting, the volume of the melted composition cannot exceed the volume of the cavity. Moreover, once the final product has been made and the phase-change material allowed to melt, the powder structure never exists as such again.

Another process for preparing the product of this invention involves preparation of the uncoated structures by agglomeration from the melted phase-change composition, rather than by pelletizing the composition from a flowable powder. The remainder of the process is the same.

Most inert wall-forming materials can be used in the coating steps including polymer latexes, ceramic mixtures, and solvent-based polymer systems. The wall-forming compositions used in the other techniques disclosed above have been severely limited in selection and only gelatin, nylon, and urea types were practical candidates. In some cases, polymer walls can be formed during the roll coating procedure by spraying monomer mixtures into the coating machine. Crosslinking reactions can also be carried out either during encapsulation or as a post-treatment step. The wall material serves to hold the shape of the thermal energy storage material, prevent agglomeration, prevent migration of components of the thermal energy storage material, and provide surface area for contact with heat transfer media. It also prevents leaching of the thermal energy storage material. For specific heat and heat of fusion type thermal energy storage compositions, the wall is designed to prevent penetration of the heat transfer fluid.

In a preferred variation, the capsule walls are made inert so that the capsules can be potted in building materials such as plastic or concrete to provide passive storage without seepage or chemical interaction with the substrate.

An important feature of the process and product is that the composition be coated with at least one seamless layer of inert wall-forming material in an amount ranging from about 5% to about 30% by weight of the product. Preferably, there will be at least two layers, but in all cases the layers are required to be seamless. Of course, additional layers with seams can be present provided tha there is at least one and preferably two seamless layers of wall forming material in the amount above specified.

Among the features and advantages of this invention is the provision of a method of packaging thermal energy storage materials so they can be used cost-effectively in direct-contact heat exchange systems and as additives to plastic, concrete, and other building materials. Another feature is the provision of a protective cover around the typical pill-to-marble-sized (i.e., ⅛ inch to ¾ or 1 inch) quantities of thermal energy storage materials to protect them from heat transfer fluid or other agents. Other features are the prevention of leaching and separation of thermal energy storage components, as well as agglomeration of the thermal energy storage material. Other features include a large surface area for heat transfer to occur; providing a method of attaining energy dense, cost-effective thermal energy storage systems. This invention reduces system costs while providing a way to save energy by permitting convenient use of periodic energy supplies. Further features and advantages will be apparent to those skilled in this art from reading the specification and claims hereunder.

BRIEF DESCRIPTION OF THE DRAWINGS

The figures are conceptual representations of the methods and products of this invention.

DETAILED DESCRIPTION OF THE INVENTION

Figure 1:
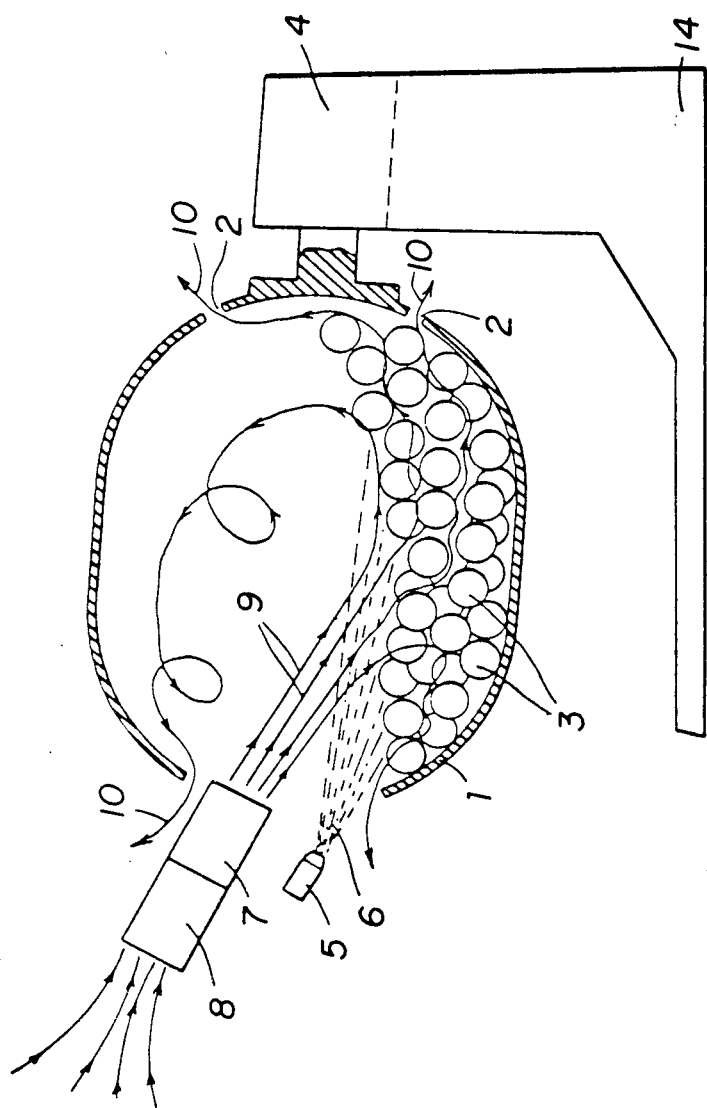
FIG. 1 projects the method by which the thermal energy storage material is encapsulated.

A schematic of the preparation process is shown in FIG. 1. The thermal energy storage composition 3 is placed in a chamber 1 for coating with various materials to form the product of this invention.

The thermal energy storage composition is a material that melts within the application temperature range, thereby absorbing and storing large quantities of heat at the phase change temperature. Examples are sodium sulfate decahydrate, sodium thiosulfate pentahydrate, calcium chloride hexahydrate, magnesium nitrate hexahydrate, the eutectic of magnesium nitrate hexahydrate and ammonium nitrate, potassium fluoride tetrahydrate, sodium acetate trihydrate, stearic acid, the eutectic of naphthalene and benzoic acid, and paraffinic hydrocarbons.

Preferred thermal energy phase-change storage composition are: sodium sulfate decahydrate, sodium thiosulfate pentahydrate, calcium chloride hexahydrate, magnesium nitrate hexahydrate, stearic acid and paraffinic hydrocarbons.

In all cases the thermal energy storage composition can be used by itself or with additives that may impart stability or enhance performance in a number of ways. For example, the additives may impart effects on the cooling/heating curve profile, such as reduction of supercooling, they may be used to change the melting point to meet various applications, or they may be helpful to bind component powders so that pellets can be formed without crumbling or to help provide the correct relationship between the apparent solid density and the liquid density of the composition. These additives are known in the art. In all cases the choice of thermal energy storage composition will depend upon the temperature at which the system employing the composition is intended to operate.

Figure 2:
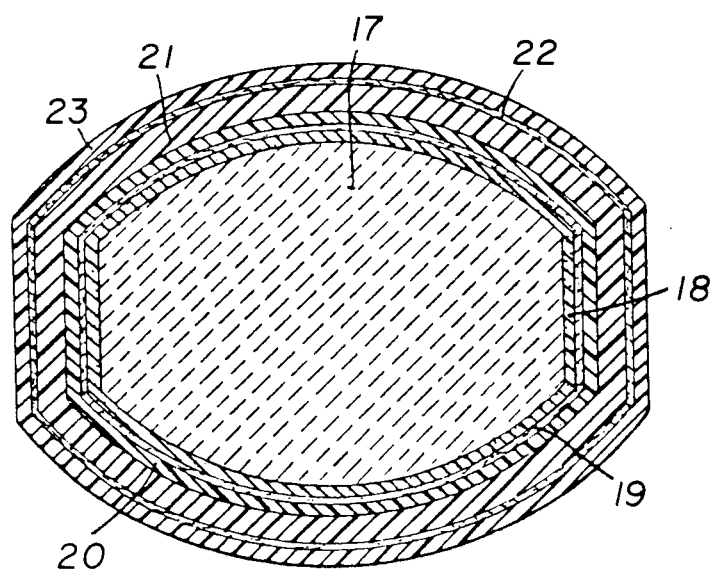
FIG. 2 shows an enlarged cross section of a typical encapsulated thermal energy storage material of this invention.

When the thermal energy storage composition is selected, it is pressed into pellets under conditions of temperature, pressure, and time that are governed by the individual thermal energy storage material. The size and shape of the pellets are dependent on system engineering specifications. The pellets can be small or large but a preferred size is between that of a typical pill and a marble, that is, from about ⅛ inch to about 1 inch. The shape can be simple or intricate, but a preferred shape is shown in FIG. 2. Conventional commercial pelletizing machines can be used, similar to those now used to make pharmaceutical pills, nuclear fuel pellets, and the like.

With reference to the figures, once the thermal energy storage material has been compressed or compacted into pellets 3, they are placed in chamber 1. Chamber 1 is a rotating drum having exhaust ports 2 and attached to motor 4, which is supported by base 14. Motor 4 is adapted to rotate chamber 1 to cause movement of the pellets 3. At the same time, air blower 7, which may employ air heater 8, directs a flow of air 9 into contact with pellets 3. Exhaust air 10 escapes through the mouth of chamber 1 and through ports 2. Spray pump 5 is adapted to deliver various materials 6 for coating on the pellets 3. As is apparent from FIG. 1, rotation of chamber 1 by motor 4 and use of air blower 7 and/or spray pump 5 permits the application and treatment of a variety of material on the pellets 3.

The properties of the encapsulating layer depend on the choice and characteristics of the sprayed material, the thickness of deposit, and the mechanism of fixing. For specific heat and heat-of-fusion thermal energy storage materials, walls are desired that are impervious to heat transfer fluid and the thermal energy storage material itself. Thick, strong walls that may be cross-linked or post-cured are required. Examples of wall materials are resinous latexes such as Goodrich Geon 576, 652, 2679, 2600X4, 660X1, and 660X2 and Rohm & Haas Rhoplex AC1230, MU17, MU2, and MU9. Other examples include rubber latexes and epoxy, polyurethane, and acrylic polymers. A balance among cost, performance and the intended use contribute to the selection criteria. In some instances more than one material may be desirable. For example, a first encapsulating layer may be deposited that has a high degree of elasticity, allowing it to absorb the stresses of thermal energy storage material expansions and contractions. A second, outer layer may then be deposited that has less elasticity but is more impervious. Many variations in the processing are possible and, in fact, are determined by the nature of the thermal energy storage composition and the requirements of the particular application. For example, pellets having strong tendencies to flake, chip, or crumble may require a thick coating with a low molecular weight polymer prior to vigorous tumbling in the roll coater.

In a preferred embodiment, the thermal energy storage of FIG. 2 is manufactured, using the device shown in FIG. 1. Pellets 3 are loaded into chamber 1. Blower 7 is started as is motor 4 to rotate the pellets 3 in the presence of forced air 9, which removes fines and dust from the tablets. Heater 8 is energized to dry the pellets if necessary, which at this time consists of one of the thermal energy storage compositions 17 shown in FIG. 2, while maintaining the temperature below the melting point of the phase-change composition.

A primer 18 is coated onto the composition 17 via spray pump 5. This primer 18 serves to seal the core material 17 from other coating materials. Quite often, most of the salts used for latent heat storage-type compositions will cause coagulation of latex-type coating materials. The primer should be a material which is chemically inert with respect to both core material and the coating. A preferred primer material is an asphalt material which has been thinned with a hydrocarbon solvent. Such a primer also improves the adhesion of the coating to the core. Another function of the primer is to indicate the degree of damage to the capsule during the remainder of the process. Since the primer is often times a different color than the core, such as with asphalt, damage or imperfections to the core are revealed by a change in color. While one primer coat may be satisfactory for some applications, it is sometimes necessary or desirable to apply several primer coats, up to approximately 2% by weight, based on the core material 17. Drying, such as by air or heated air circulated by blower 8, is preferred. However, for good adhesion, the asphalt or other primer must be allowed to soak into the surface of the tablet. If the drying step proceeds too rapidly, the primer may quickly wear off during the subsequent processing. On the other hand, if drying is too slow, the tablets may stick together in large clumps between primer applications.

After the final coat of primer 18, while it is still wet, a layer of mica 19 or other similar material is applied in an amount sufficient to increase the weight of the product by approximately about 0.5%. The mica layer 19 serves as a water vapor barrier and helps to prevent tablet agglomeration.

Next, a thin layer of a quick-drying resin with good adhesion and covering characteristics, as well as good elasticity, is applied. This resin 20 may be a latex, such as butadiene-acrylonitrile copolymer latex or other similar resin added through spray pump 5. Satisfactory products can be prepared by using such a polymer in the amount of approximately 3% by weight of the product. This layer 20 may be deposited all at once or by the application of a multiplicity of very thin layers. It is essential that the covering or coating be seamless, so that subsequent use of the product will not have a joint or junction which can be subjected to successive stress. The advantage of this highly-resilient resin is that it protects the relatively brittle primer layer 18, which would otherwise be damaged by friction between tablets as they are tumbled in the coating drum. The acrylonitrile layer cushions the tablet during the remainder of the process and also adds additional desirable elasticity to the finished wall.

The major portion of the structual wall 21 is next applied which provides structural strength and resistence to moisture vapor transmission. if this wall material has too high of a permeability factor, the phase change material, thermal energy storage composition, will lose its hydration, causing the loss and possible damage to the product's environment of heat-storage capacity. One preferred polymer for this part of the wall is the copolymer of vinylidene chloride-acrylic copolymer. This final wall component will preferably comprise approximately 15% of the weight of the finished product. It is necessary that the wall be built from very thin coats and be properly cured between applications to prevent the formation of seams. Proper curing is indicated by a combination of three factors: surface tackiness, transparency and shininess. Thick coats, resulting from excessive coating application or improper curing, might cause the tablets to stick together and pull as they are tumbled, causing bumps and thin spots in the walls. These imperfections may cause the tablet to fail early in use. If the coating is being properly applied, the resulting wall will be smooth, shiny and transparent. Periodically, the curing air should be gently heated to speed up the curing process. Nevertheless, the temperature should be maintained at all times during manufacture below that at which the core material 17 will melt. As the wall 21 is nearing completion, a dusting of mica 22 of similar material can preferably be added between the latex layers. This addition will again improve vapor transmission resistence. The final outer layer 23, preferably of the same composition as layer 21, and the previous outer layer 21 combine to comprise approximately 20% of the finished product weight. Thinner walls are, of course, possible and thicker walls can be employed if desired. Normally, the total amount of wall forming material comprising the shell member will range from about 5% to about to about 30% by weight of the total product.

The invention is further illustrated by the following examples.

EXAMPLE 1

A glauber salt eutectic mixture, having a melting point of 73° F., was formulated as follows: sodium sulphate, 17%; sodium carbonate, 20%, borax, 3%; clay, 3%, water 57%. This mixture was chilled and passed through a tabletting machine as a flowable powder and formed into pellets. The tabletted pellets are then encapsulated in asphalt, which has been thinned with hydrocarbon solvent as primer layer 18, followed by the addition of mica layer 19. The two latex materials described above were used to form layers 20, 21 and 23. Layer 20 was formed from butadiene-acrylonitrile latex and layers 21 and 23 from vinylidene chloride-acrylic copolymer. Mica was again used for layer 22. The various layers which were applied to form the coatings were seamless. These layers were built up as the product rotated in the drum, and were substantially uniform in thickness. The amounts of the various coatings, and the volumetric relationships, were at about the midportions of the ranges specified in the Brief Summary of the Invention.

The pellets are convex tablets with rounded edges measuring about ½ inch in diameter and about ⅜ inch thickness after final coating.

During the tabletting step, the compaction was controlled to provide an apparent solid density of 1.10, the liquid density being 1.28.

Each of the two products is performance tested by dispersing 30% by weight of the product throughout a standard size conventional concrete mortar mix brick, and the brick and product then allowed to cure 3 days. The brick is then heated to 160° F. and held at this temperature for several hours. The brick is then subjected to numerous changes in temperature, cycling above and below the phase-change meling point. No fractures or other damage to the brick or products are observed.

EXAMPLE 2

In this example, a sodium sulphate decahydrate thermal energy storage material comprising 42% sodium sulphate, 3% borax, 3% clay and 52% water is formed into a product according to the present invention. The ingredients are passed several times through a colloid mill to reduce the particles to micron size and thereby fully hydrate the salt and form a completely homogeneous suspension of all of the components. When milling is complete, the phase change material mixture is solidified and ground to pass through a number 8 sieve. This degree of fineness is desirable for proper flow characteristics during pelletization. Solid lubricants, such as lithium stearate, may be added in trace amounts to improve the flow and compression characteristics during the pelletization.

This bulk material is conveyed to a tablet-forming press of standard design. The powder flow is from a feed-hopper to the compression chamber where a charge is sized and shaped according the press dies in the machine. The standard shape of the tablet is that of a short cylinder with convex ends. Tablet diameter is about ½ inch with a thickness of about ⅜ inch. The compression is controlled so that the tablet has an apparent solid density which is equal to the liquid density (1.47) of the composition. The solid density of the phase change composition is 1.56.

The various encapsulation steps described in Example 1 are then carried out such that the finished product will have a cross-section as shown in FIG. 2 of the drawings. When performance tested as in Example 1, no fractures or failures of the brick are observed.

EXAMPLE 3

The procedures of Examples 1 and 2 are repeated for each of the following phase change compositions: glauber salt eutectic mixture, sodium hydroxide, polyethylene, sodium sulfate decahydrate, sodium thiosulfate pentahydrate, calcium chloride hexahydrate, magnesium nitrate hexahydrate, the eutectic of magnesium nitrate hexahydrate and ammonium nitrate, potassium fluoride tetrahydrate, sodium acetate trihydrate, stearic acid, the eutectic of naphthalene and benzoic acid and paraffinic hydrocarbons.

Each of the pelletized compositions are then encapsulated just as in Example 1.

Each of the above phase-change compositions is then encapsulated as in Example 1 with the following separate materials for layers 20, 21, and 23 (same material for each layer): a copolymer latex of butadiene-acrylonitrile, a copolymer of vinylidene chloride-acrylic, resinous latexes, rubber latexes, epoxy polymers, polyurethane polymers, acrylic polymers, cellulose acetate and polyamides.

These encapsulated products are performance tested as in Example 1 and no fractures or damage to the bricks or products are observed.

EXAMPLE 4

The structures for encapsulation earlier described can be formed by means other than by compaction of powdered PCM chemicals, as illustrated in this example. Another method is that of agglomeration, either in rotating pans, fluidized bed machines, or devices having characteristics of both these types. In a rotating pan agglomerator, seed crystals are sprayed with molten material while the pan turns. Density of the particles can be controlled by varying the temperature and droplet size of the sprayed molten, phase-change composition, and by rotation speed and cooling of the pan. Structure size is controlled by duration of the cycle and size of the seed crystals. The structure formed will be either spherical or egg-shaped.

A fluidized bed agglomerator can form structures for subsequent encapsulation by similar spraying of molten material on seed crystals, but in this case, the pellets are suspended in an air stream, and behave, in bulk, as fluid (i.e. having a zero angle of repose). Some particle formation is caused by collision and adhesion of relatively large particles. As a general rule, particles agglomerated in a fluid bed are more irregular in shape and of lower density than the product of rotating pan agglomerators. Degree of fluidization is a factor in the final density of the formed particle, as is the characteristics of the spraying into the fluidized bed.

Optimum control of the particle size distribution, shape, and density can be achieved with a device that combines characteristics of both the above machines (Glatt Air Techniques is one manufacturer of such a device). The particles are formed in a rotating pan that has a slot at the outer circumference of the pan bottom. Through this slot, air sufficient to somewhat fluidize the particle bed is admitted. The major factors that govern particle density in this rotary-fluidized bed granulator are: pan rotation speed, fluidizing air temperature, and PCM application rate. The size of the air admitting slot has a minor effect. Through proper combination of the control factors, the density of the PCM particle formed can be controlled to that necessary for the proper performance of the finished product. The rotary-fluidized bed granulator just described can also be configured to properly apply the various coating materials previously described, giving the potential of complete fabrication of the PCM capsule with one machine.

Pellets of sodium sulphate hexahydrate (Glauber's salt) are formed in a rotating pan type granulator as described above. The PCM is applied at a temperature just above melting temperature in a fine spray to form egg-shaped particles ranging in size from ½ to ¾ of an inch in diameter. The density of the PCM pellets is found to be slightly less than the 1.47 of the molten PCM as deemed essential in this invention. The particles are then encapsulated as described in Example 1. After performance testing as in Example 1, no damage to the product or the construction materials is observed.

Examples 5 and 6 again demonstrate the criticality of the density relationship of the phase-change structures and the densities of the phase-change composition per se, in each of its states.

EXAMPLE 5

A similar product using calcium chloride hexahydrate was prepared. This material is highly hygroscopic, and for that reason precautions must be taken during pelletization and encapsulation to prevent the adsorption of water from air to the surface of the tablets. This surface water would prevent coating film formation or possibly even dissolve the tablet.

Calcium chloride hexahydrate is commercially available with various stabilizing additives premixed therein. The tablet-forming is accomplished under conditions whereby the equilibrium relative humidity, namely about 35%, is maintained to prevent adsorption of water from the air.

During the encapsulation step, the primer coat of asphalt must be thicker to ensure chemical isolation of the salt from later-used latex materials due to the fact that the salt coagulates most latexes. Therefore 5% asphalt, based upon the total weight of the product, is applied. Mica is also added, and the remaining layers are then applied, as previously described in Example 1.

The apparent solid density of the structure before coating is about 1.55 and the liquid density of the phase-change composition is 1.35. Thus, when the phase-change composition melts, its volume will exceed the volume of the cavity of the product. The product size is about 5/16 inch in diameter and ¼ inch in height.

When performance tested as in Example 1, the construction materials shatter upon inital heatup, as the density relationships above-mentioned are outside of the critical requirements for the products of this invention.

EXAMPLE 6

A similar product was prepared, without difficulty using the process of this invention, except as otherwise pointed out, in which a commercially available paraffin, having a melting point of 116° F., was used. A 5% addition of stearate was necessary to improve powder flow and compaction properties. The tablets were formed as previously described. Encapsulation of this material is far easier than those previously described. The primer coating of vinylidene-chloride-acrylic copolymer readily adheres to the wax and forms a strong, tight coating. The application of a butadiene-acrylonitrile latex followed by an additional vinylidene-chloride-acrylic copolymer results in a finished product as shown in FIG. 2.

The apparent solid density of the compacted structure before coating is 0.87 and the liquid density of the composition is 0.80. As expected, the product failed in the performance test, as in Example 5 above, as the volume of the cavity of the product shell member was less than the liquid volume of the wax composition.

The above products of Examples 1–4, prepared according to the examples described herein, were evaluated as thermal energy storage products. The products were evaluated over a variety of heat-cycle tests. These tests quite successfully showed that all of the properly encapsulated compositions described above were cycling through heat and cold cycles without failure such that a twenty-year commercial life or more is anticipated for all of these products. This is to be contrasted with results of evaluation efforts which were made on compositions in which the apparent solid density exceeded the liquid density of the composition, as in Examples 5 and 6. Inevitably, these highly compacted products failed during cycling due to expansion during transition from the solid to the liquid phase. Similarly, a number of thermal energy storage products were prepared as in Examples 1–4, except during the encapsulation step, a seam was permitted to form in the layers closest to the thermal storage composition. After some degree of cycling, the capsules failed, with the phase change compositions leaking from the capsules at the seams in the capsule.

We claim:

1. A thermal energy storage composite product capable of incorporation within rigid building construction components without causing fracture or damage to the components or product after the product undergoes repeated thermal change cycles, said product comprising:

(a) an outer shell member having a longest dimension of from about ⅛ inch to about 1 inch and having interior surfaces defining only a single internal cavity that is adapted to permanently encase a thermal energy storage phase-change composition, said shell being comprised of at least one seamless layer of a wall-forming material that is substantially impermeable to and non-reactive with said phase-change composition or water, the total volume of the wall-forming material being from about 5% to 30% of the volume of said cavity; and (b) a thermal energy storage phase-change composition permanently disposed within the single cavity of the shell, said phase-change composition being capable of existing in solid form, a melted liquid form, or a transition state that includes both the liquid and the solid forms, the composition being present in a quantity such that the total volume of composition whether in the solid form, the liquid form, or the transition state does not exceed the volume of the cavity.

2. The composite product as defined in claim 1 wherein the shell member of (a) is comprised of multiple seamless coatings of the wall-forming material.

3. The composite product as defined in claim 1 wherein the outer shell member of (a) has convex shaped outer surfaces with rounded edges.

4. The composite product as defined in claim 1 wherein the wall-forming material of (a) is a material selected from the group consisting of a copolymer latex of butadiene-acrylonitrile, a copolymer of vinylidene chloride-acrylic, resinous latexes, rubber latexes, epoxy polymers, polyurethane polymers, acrylic polymers, cellulose acetate and polyamides.

5. The composite product as defined in claim 1 wherein the interior surfaces of shell member of (a) are coated with a primer substance.

6. The product as defined in claim 5 wherein the primer coating is a water-resistant primer substance.

7. The product as defined in claim 6 wherein the water-resistant primer coating is comprised of asphalt or acrylic polymer.

8. The product as defined in claim 5 wherein the primer coating is present in a volumetric amount that is less than about 5% of the volume of the cavity.

9. The product as defined in claim 2 wherein mica is dispersed onto at least one of the coatings comprising the shell member.

10. The product as defined in claim 1 wherein the thermal energy phase-change composition of (b) has a liquid density that is at least 85% but less than 100% of the solid density of the composition.

11. The product as defined in claim 1 wherein the thermal energy phase-change composition of (b) has a phase change transition temperature within the range of about 7° C. to about 90° C.

12. The product as defined in claim 1 wherein the thermal energy phase-change composition of (b) is selected from the group consisting of a Glauber salt eutectic mixture, sodium hydroxide, polyethylene, sodium sulfate decahydrate, sodium thiosulfate pentahydrate, calcium chloride hexahydrate, magnesium nitrate hexahydrate, the eutectic of magnesium nitrate hexahydrate and ammonium nitrate, potassium fluoride tetrahydrate, sodium acetate trihydrate, stearic acid, the eutectic of naphthalene and benzoic acid and paraffinic hydrocarbons.

* * * * *